US012773855B2

(12) United States Patent
Jung et al.

(10) Patent No.: US 12,773,855 B2
(45) Date of Patent: Oct. 27, 2026

(54) SUBSTRATE PROCESSING APPARATUS AND METHOD

(71) Applicant: SEMES CO., LTD., Cheonan-si (KR)

(72) Inventors: Hyunjik Jung, Cheonan-si (KR); Yong Won Kim, Cheonan-si (KR)

(73) Assignee: SEMES CO., LTD., Chungcheongnam-do (KR)

(*) Notice: Subject to any disclaimer, the term of this patent is extended or adjusted under 35 U.S.C. 154(b) by 242 days.

(21) Appl. No.: 18/240,007

(22) Filed: Aug. 30, 2023

(65) Prior Publication Data

US 2024/0092094 A1 Mar. 21, 2024

(30) Foreign Application Priority Data

Sep. 19, 2022 (KR) ........................ 10-2022-0118191

(51) Int. Cl.
*B41J 11/00* (2006.01)

(52) U.S. Cl.
CPC ................................. *B41J 11/0015* (2013.01)

(58) Field of Classification Search
CPC ... B41J 11/0015; B41J 2/01; G02F 1/133516; G02F 1/1303; B65G 49/061; H01L 21/68735
See application file for complete search history.

(56) References Cited

U.S. PATENT DOCUMENTS 10,522,370 B2 12/2019 Park et al.
2016/0240419 A1* 8/2016 Sieber ................. C23C 16/4585
2022/0128844 A1* 4/2022 Kim .................. G02F 1/133308

FOREIGN PATENT DOCUMENTS

JP 2008147291 A * 6/2008
JP 2021171663 A * 11/2021 ............ B41J 3/4073
KR 1020020036698 A 5/2002
KR 1020070114034 A 11/2007
KR 1020110010252 A 2/2011
KR 1020140018080 A 2/2014
KR 1020180012416 A 2/2018
KR 1020180029145 A 3/2018
KR 1020180137656 A 12/2018
KR 20220011259 A * 1/2022 ............ G03F 7/168

OTHER PUBLICATIONS

English Translation KR20220011259 (Year: 2022).*
English Translation JP2008147291 (Year: 2008).*
English Translation JP-2021171663 (Year: 2021).*
English Translation JP-2008147291-A (Year: 2008).*
English Translation KR 20220011259 A (Year: 2022).*
Office Action dated Apr. 25, 2024, for the corresponding Korean Patent Application No. KR 10-2022-0118191.

* cited by examiner

*Primary Examiner* — Ricardo I Magallanes
*Assistant Examiner* — Tracey M Mcmillion
(74) *Attorney, Agent, or Firm* — Muir Patent Law, PLLC

(57) ABSTRACT

Provided is a substrate processing apparatus and method capable of preventing suction holes from being clogged due to airflow generated when a substrate is floated and printed, and the substrate processing apparatus includes a substrate stage for supporting a substrate, and a treatment liquid ejection device mounted above the substrate stage to eject a treatment liquid onto the substrate, wherein the substrate stage includes a floating plate for floating at least a portion of the substrate, and an airflow blocking member for blocking at least a portion of a gap between the substrate and the floating plate to block airflow flowing into the gap.

17 Claims, 10 Drawing Sheets

SUBSTRATE PROCESSING APPARATUS AND METHOD

CROSS-REFERENCE TO RELATED PATENT APPLICATION

This application claims the benefit of Korean Patent Application No. 10-2022-0118191, filed on Sep. 19, 2022, in the Korean Intellectual Property Office, the disclosure of which is incorporated herein in its entirety by reference.

BACKGROUND OF THE INVENTION

1. Field of the Invention

The present invention relates to a substrate processing apparatus and method and, more particularly, to a substrate processing apparatus and method capable of preventing suction holes from being clogged due to airflow generated when a substrate is floated and printed.

2. Description of the Related Art

Generally, in existing substrate processing apparatuses for performing a printing process by ejecting a treatment liquid onto an upper surface of a substrate while the substrate is floated using a floating stage or the like to protect a lower surface of the substrate, a plurality of emission holes connected to a gas supply line and a plurality of suction holes connected to a gas suction line may be provided in the floating stage and the substrate may be floated to a certain height by adjusting a gas emission pressure of the emission holes and a gas suction pressure of the suction holes.

However, the gas emission pressure of the emission holes and the gas suction pressure of the suction holes may be changed very delicately depending on an ambient environment, the type of the substrate, or the like and thus the height to which the substrate is floated may be partially changed due to the change in gas emission pressure or gas suction pressure.

In the existing apparatuses, various types of substrate deformation, e.g., warpage of the substrate by external force, may easily occur under various circumstances, and such substrate deformation may change a shooting distance of the treatment liquid and cause impact point errors of droplets of the treatment liquid ejected out of correct positions, resulting in defective printing.

Furthermore, when mist of the treatment liquid, which is generated in the form of fine particles during the printing process, is sucked into the suction holes together with airflow and sticks to or clogs the suction holes, the gas suction pressure may be changed, the height to which the substrate is floated may be partially changed due to the change in gas suction pressure, and thus impact point errors and defective printing may occur.

SUMMARY OF THE INVENTION

The present invention provides a substrate processing apparatus and method capable of preventing narrowing or clogging of suction holes by blocking airflow or fume gas flowing into a gap between a substrate and a floating plate by using an airflow blocking member when the substrate is floated and moved, thereby increasing precision or accuracy of printing. However, the above description is an example, and the scope of the present invention is not limited thereto.

According to an aspect of the present invention, there is provided a substrate processing apparatus including a substrate stage for supporting a substrate, and a treatment liquid ejection device mounted above the substrate stage to eject a treatment liquid onto the substrate, wherein the substrate stage includes a floating plate for floating at least a portion of the substrate, and an airflow blocking member for blocking at least a portion of a gap between the substrate and the floating plate to block airflow flowing into the gap.

The airflow blocking member may include airflow blocking blades each having a slope at an upper end to generate a diagonally upward airflow and having an upper end height lower than an upper surface height of the floated substrate.

The upper end height of the airflow blocking blades may be adjusted using a height adjuster.

The substrate stage may further include a gas supply line connected to one or more emission holes provided in the floating plate to supply a gas to the emission holes, and a gas suction line connected to one or more suction holes provided in the floating plate to suck a gas through the suction holes.

The substrate stage may further include a left adsorption pad provided on a left side of an upper surface of the floating plate and having at least a portion higher than the floating plate to adsorb a left side of a lower surface of the substrate through one or more vacuum adsorption holes, and a right adsorption pad provided on a right side of the upper surface of the floating plate and having at least a portion higher than the floating plate to adsorb a right side of the lower surface of the substrate through one or more vacuum adsorption holes.

The vacuum adsorption holes of the left adsorption pad and the vacuum adsorption holes of the right adsorption pad are connected to the gas suction line.

The substrate stage may further include lift pins liftably mounted in the floating plate to support the substrate, and a lift pin lifting device for lifting the lift pins.

The substrate stage may further include a base plate spaced apart from the floating plate to form an airflow induction space, a gas supply pipe mounted in a portion of the airflow induction space and connected to the gas supply line, and a gas suction pipe mounted in another portion of the airflow induction space and connected to the gas suction line.

The substrate stage may further include an airflow induction member for blocking at least a portion of the airflow induction space to adjust an aperture ratio of the airflow induction space in order to prevent generation of turbulence.

The airflow induction member may include airflow induction blades each having a rounded upper end or having at least a portion provided in a streamlined shape to prevent generation of turbulence.

An upper end height of the airflow induction blades may be adjusted using a height adjuster.

The airflow induction blades may be lifted using a blade lifting device based on a transfer speed of the substrate stage or the airflow.

The substrate processing apparatus may further include a first moving device for moving the substrate stage in a first direction from a standby position to a treatment liquid ejection position.

The first moving device may include a linear motor for moving the substrate stage along a transfer rail, and air bearings mounted under the substrate stage to support the substrate stage with pressure of air.

The substrate processing apparatus may further include a second moving device for moving the treatment liquid ejection device in a second direction.

According to another aspect of the present invention, there is provided a substrate processing method including (a) receiving a substrate from a substrate transfer device by lifting lift pins from a floating plate of a substrate stage, (b) floating the substrate to a certain height from the floating plate by using a gas supply line and a gas suction line while lowering the lift pins, and blocking airflow flowing into a gap between the substrate and the substrate stage by using an airflow blocking member, (c) moving the substrate stage in a first direction from a standby position to a treatment liquid ejection position by using a first moving device, and (d) ejecting a treatment liquid onto the substrate at the treatment liquid ejection position while moving a treatment liquid ejection device in a second direction by using a second moving device.

In step (b), both edges of a lower surface of the substrate may be adsorbed using a left adsorption pad and a right adsorption pad.

In step (c) or (d), turbulence generated when the substrate stage is moved in the first direction may be prevented using an airflow induction member.

In step (c) or (d), the substrate stage may be moved in the first direction by using a linear motor and air bearings.

According to another aspect of the present invention, there is provided a substrate processing apparatus including a substrate stage for supporting a substrate, a first moving device for moving the substrate stage in a first direction from a standby position to a treatment liquid ejection position, a treatment liquid ejection device mounted above the substrate stage to eject a treatment liquid onto the substrate, and a second moving device for moving the treatment liquid ejection device in a second direction, wherein the substrate stage includes a floating plate for floating at least a portion of the substrate, an airflow blocking member for blocking at least a portion of a gap between the substrate and the floating plate to block airflow flowing into the gap when the floating plate is moved in the first direction, a gas supply line connected to one or more emission holes provided in the floating plate to supply a gas to the emission holes, a gas suction line connected to one or more suction holes provided in the floating plate to suck a gas through the suction holes, a left adsorption pad provided on a left side of an upper surface of the floating plate and having at least a portion higher than the floating plate to adsorb a left side of a lower surface of the substrate through one or more vacuum adsorption holes, a right adsorption pad provided on a right side of the upper surface of the floating plate and having at least a portion higher than the floating plate to adsorb a right side of the lower surface of the substrate through one or more vacuum adsorption holes, a base plate spaced apart from the floating plate to form an airflow induction space, and an airflow induction member for blocking at least a portion of the airflow induction space to adjust an aperture ratio of the airflow induction space in order to prevent generation of turbulence.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

Figure 1:
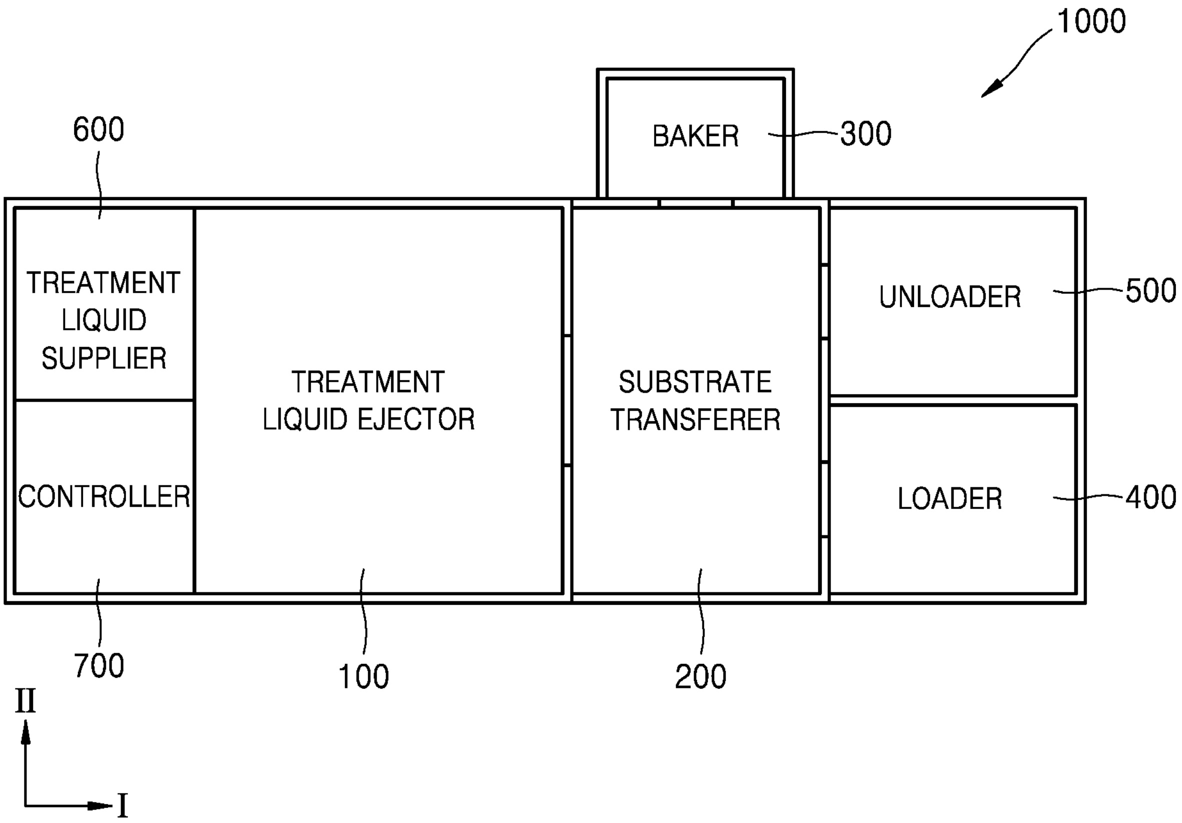
FIG. 1 is a conceptual view of a substrate processing apparatus according to some embodiments of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity and convenience of explanation.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

FIG. 1 is a conceptual view of a substrate processing apparatus 1000 according to some embodiments of the present invention.

As shown in FIG. 1, the substrate processing apparatus 1000 may apply a treatment liquid to a target object in an inkjet manner. For example, the target object may be a glass substrate, a silicon substrate, a display board, or a color filter substrate of a liquid crystal display panel, and the treatment liquid may be red (R), green (G), and blue (B) ink in which pigment particles are mixed in a solvent. The ink may be applied to inner regions of a black matrix provided as a grid pattern on the color filter substrate.

The substrate processing apparatus 1000 may include a treatment liquid ejector 100, a substrate transferer 200, a baker 300, a loader 400, an unloader 500, a treatment liquid supplier 600, and a controller 700.

The treatment liquid ejector 100 and the substrate transferer 200 may be arranged in a row in a first direction I and positioned adjacent to each other. The treatment liquid supplier 600 and the controller 700 may be positioned to face the substrate transferer 200 across the treatment liquid ejector 100 and arranged in a row in a second direction II.

The loader 400 and the unloader 500 may be positioned to face the treatment liquid ejector 100 across the substrate transferer 200 and arranged in a row in the second direction II. The baker 300 may be disposed adjacent to a side of the substrate transferer 200.

Herein, the first direction I may be a direction in which the treatment liquid ejector 100 and the substrate transferer 200 are arranged, the second direction II may be a direction perpendicular to the first direction I on a horizontal plane, and a third direction III may be a direction perpendicular to the first and second directions I and II.

The substrate to be applied with the treatment liquid (e.g., the ink) may be loaded into the loader 400. The substrate transferer 200 may transfer the substrate, which is loaded into the loader 400, to the treatment liquid ejector 100. The treatment liquid ejector 100 may receive the treatment liquid from the treatment liquid supplier 600 and eject the treatment liquid onto the substrate in an inkjet manner. The substrate transferer 200 may transfer the substrate from the treatment liquid ejector 100 to the baker 300. The baker 300 may heat the substrate to evaporate a liquid material (e.g., the solvent) other than a solid component of the treatment liquid (e.g., the ink) ejected onto the substrate.

The substrate transferer 200 may transfer the substrate from the baker 300 to the unloader 500. The substrate applied with the treatment liquid may be unloaded from the unloader 500. The controller 700 may control overall operations of the treatment liquid ejector 100, the substrate transferer 200, the baker 300, the loader 400, the unloader 500, and the treatment liquid supplier 600.

Figure 2:
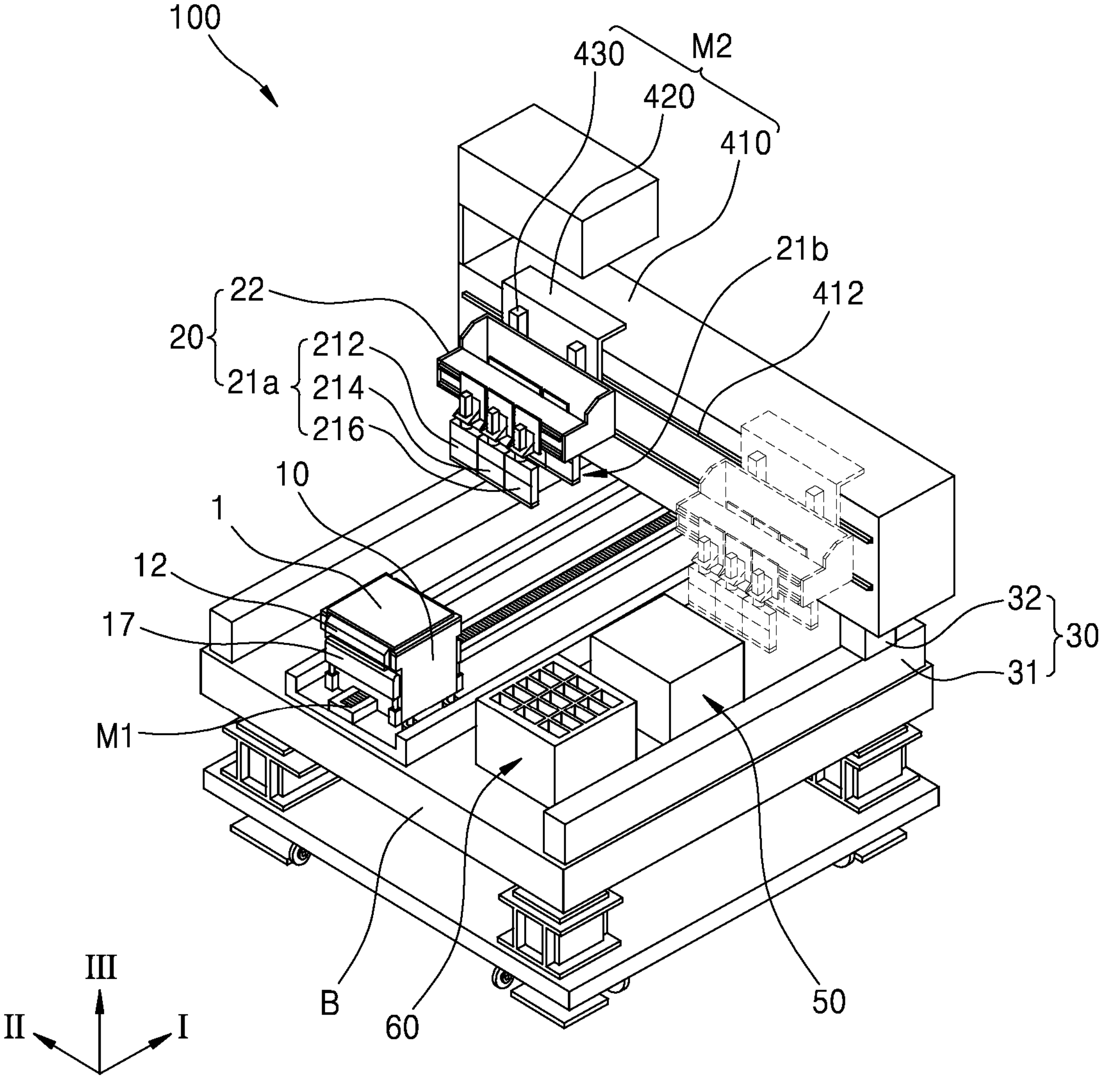
FIG. 2 is a perspective view of a substrate stage of a treatment liquid ejector of the substrate processing apparatus of FIG. 1.
Figure 3:
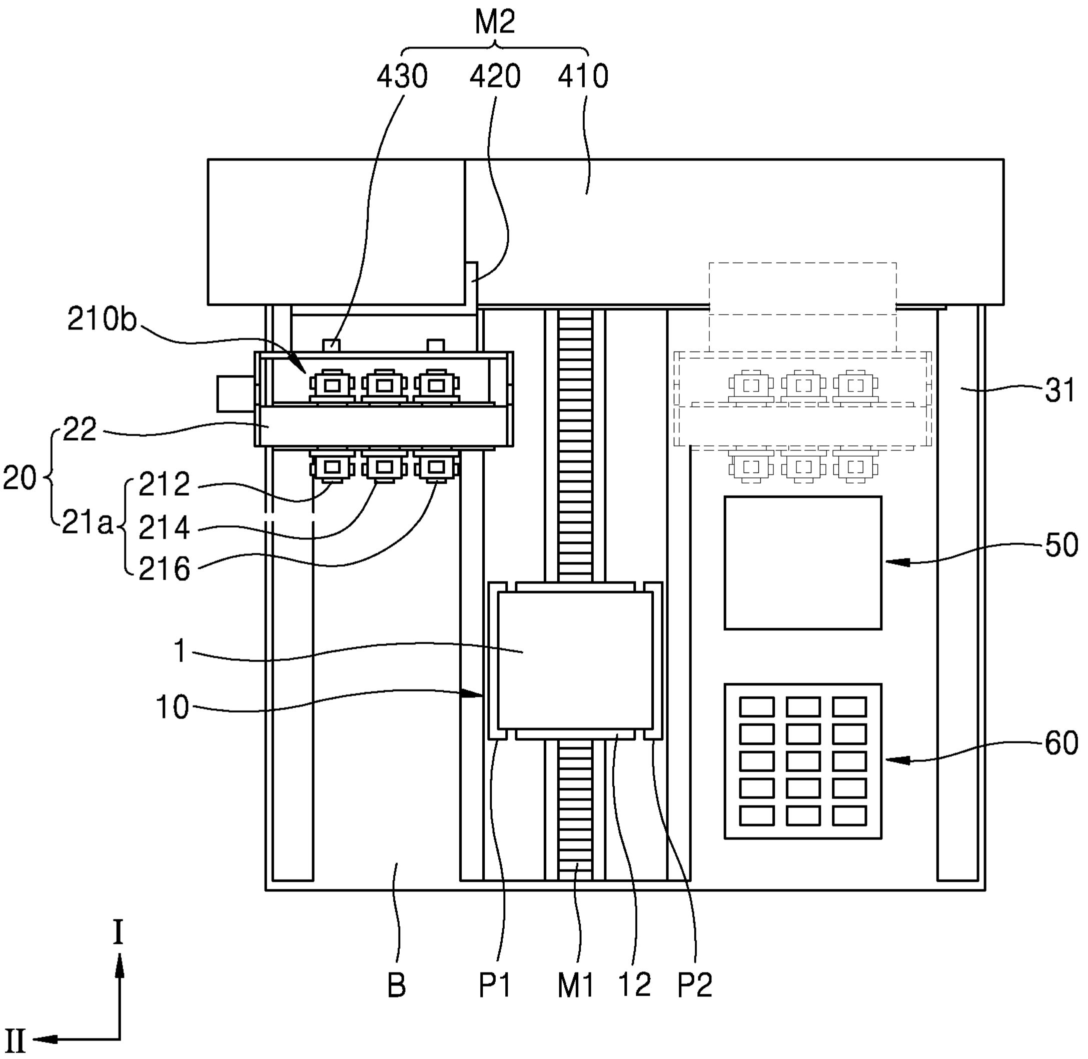
FIG. 3 is a plan view of the substrate stage of the treatment liquid ejector of FIG. 2.

FIG. 2 is a perspective view of a substrate stage 10 of the treatment liquid ejector 100 of the substrate processing apparatus 1000 of FIG. 1, and FIG. 3 is a plan view of the substrate stage 10 of the treatment liquid ejector 100 of FIG. 2.

As shown in FIGS. 1 to 3, the treatment liquid ejector 100 may include the substrate stage 10, a treatment liquid ejection device 20, moving devices 30 and M2, and head cleaning units 50 and 60.

The substrate stage 10 is a device for supporting a substrate 1 and may include a floating plate 11 (see FIG. 5) for floating at least a portion of the substrate 1, and an airflow blocking member 12 for blocking at least a portion of a gap between the substrate 1 and the floating plate 11 to block airflow flowing into the gap.

The treatment liquid ejection device 20 is a device mounted above the substrate stage 10 to eject a treatment liquid onto the substrate 1 and may include inkjet heads 21*a* and 21*b* and a bracket 22. One inkjet head 21*a* may be mounted on one side surface of the bracket 22 facing the first direction I, and the other inkjet head 21*b* may be mounted on the other side surface of the bracket 22 facing the first direction I.

Each of the inkjet heads 21*a* and 21*b* may have a red (R) head 212, a green (G) head 214, and a blue (B) head 216.

The R, G, and B heads 212, 214, and 216 may be arranged in a row in the second direction II to eject the treatment liquid onto the substrate 1 placed on the substrate stage by using an inkjet scheme for ejecting droplets.

The second moving device M2 may move the treatment liquid ejection device 20 above a path along which the substrate stage 10 is moved. The second moving device M2 may linearly move the treatment liquid ejection device 20 in the second and third directions II and III.

The second moving device M2 may include a horizontal support bar 410, a slider 420, and a lifting device 430. The horizontal support bar 410 may be positioned above a base B in such a manner that a longitudinal direction thereof faces the second direction II. Guide rails 412 may be provided on the horizontal support bar 410 along the longitudinal direction. The slider 420 may have a linear motor (not shown) embedded therein to linearly move in the second direction II along the guide rails 412. The bracket 22 of the treatment liquid ejection device 20 may be connected to the slider 420, and the inkjet heads 21*a* and 21*b* mounted on the bracket 22 may be linearly moved in the second direction II by the linear motion of the slider 420. Meanwhile, the lifting device 430 for linearly moving the bracket 22 of the treatment liquid ejection device 20 in the third direction III may be mounted on the slider 420.

The moving unit 30 may include guide rails 31 and sliders 32. The guide rails 31 may have a longitudinal direction facing the first direction I and be separately disposed at two opposite edges on an upper surface of the base B. The sliders 32 may have linear motors (not shown) embedded therein to linearly move in the first direction I along the guide rails 31. Both ends of the horizontal support bar 410 of the second moving device M2 may be separately connected to the sliders 32. The second moving device M2 including the horizontal support bar 410 may be moved in the first direction I by the linear motion of the sliders 32, and the second moving device M2 connected to the second moving device M2 may be linearly moved in the second direction II by the motion of the second moving device M2.

The head cleaning unit 50 may periodically clean treatment liquid ejection surfaces of the inkjet heads 21*a* and 21*b*, i.e., surfaces on which nozzles for ejecting the treatment liquid are provided. Normally, after the treatment liquid is ejected onto one substrate, the treatment liquid ejection surfaces of the inkjet heads 21*a* and 21*b* may be cleaned.

The head cleaning units 50 and 60 may be provided at a side of the substrate stage 10 on the upper surface of the base B. The inkjet heads 21*a* and 21*b* may be moved to the top of the head cleaning units 50 and 60 by the second moving device M2 and moved in the first direction I above the head cleaning units 50 and 60 while a cleaning process is being performed.

The first head cleaning unit 50 may perform a purging or blading process and the second head cleaning unit 60 may perform purging, blading, and blotting processes. The purging, blading, and blotting processes may be sequentially performed. The purging process is a process of expelling some of the treatment liquid contained in the inkjet heads 21*a* and 21*b* at high pressure. The blading process is a process of removing the treatment liquid remaining on the treatment liquid ejection surfaces of the inkjet heads 21*a* and 21*b* in a non-contact manner after the purging process. The blotting process is a process of removing the treatment liquid remaining on the treatment liquid ejection surfaces of the inkjet heads 21*a* and 21*b* in a contact manner after the blading process. However, the head cleaning units 50 and 60 are not limited thereto and a wide variety of cleaning units are all applicable.

Figure 4:
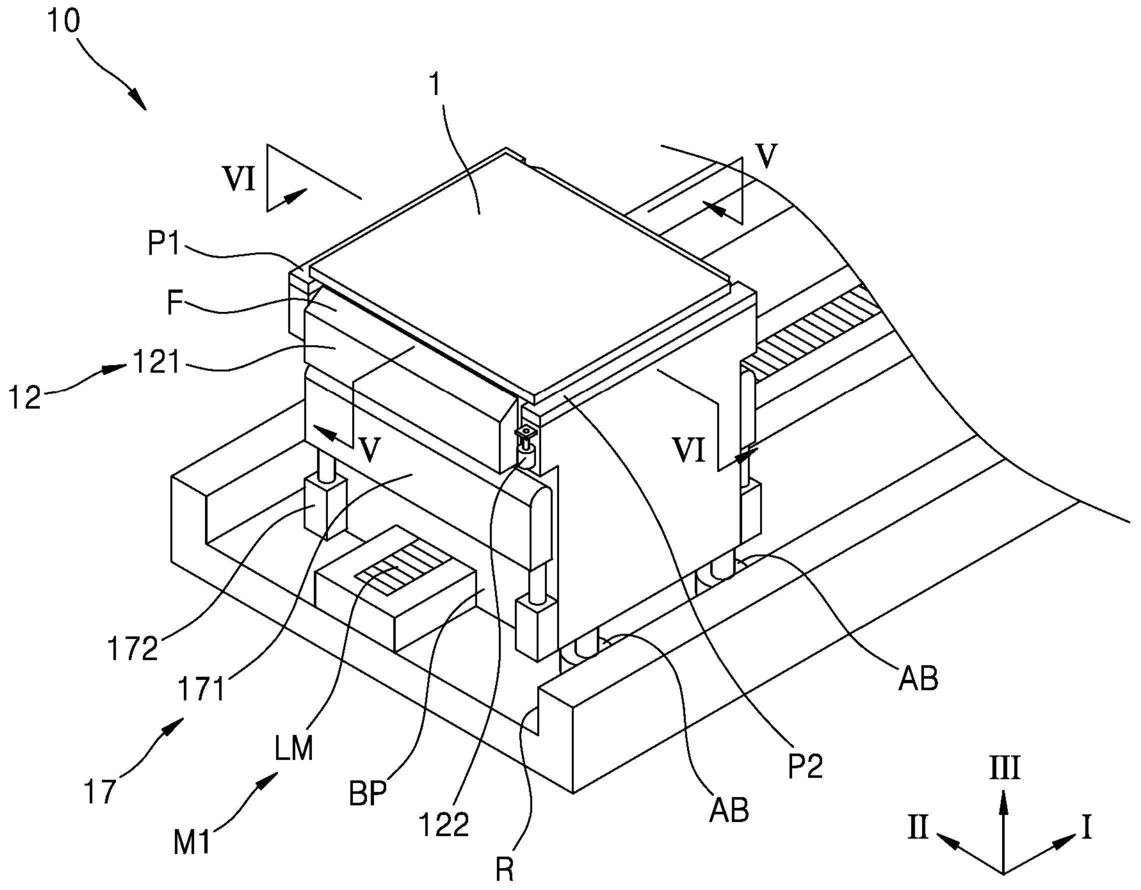
FIG. 4 is an enlarged perspective view of the substrate stage of the treatment liquid ejector of FIG. 2.
Figure 5:
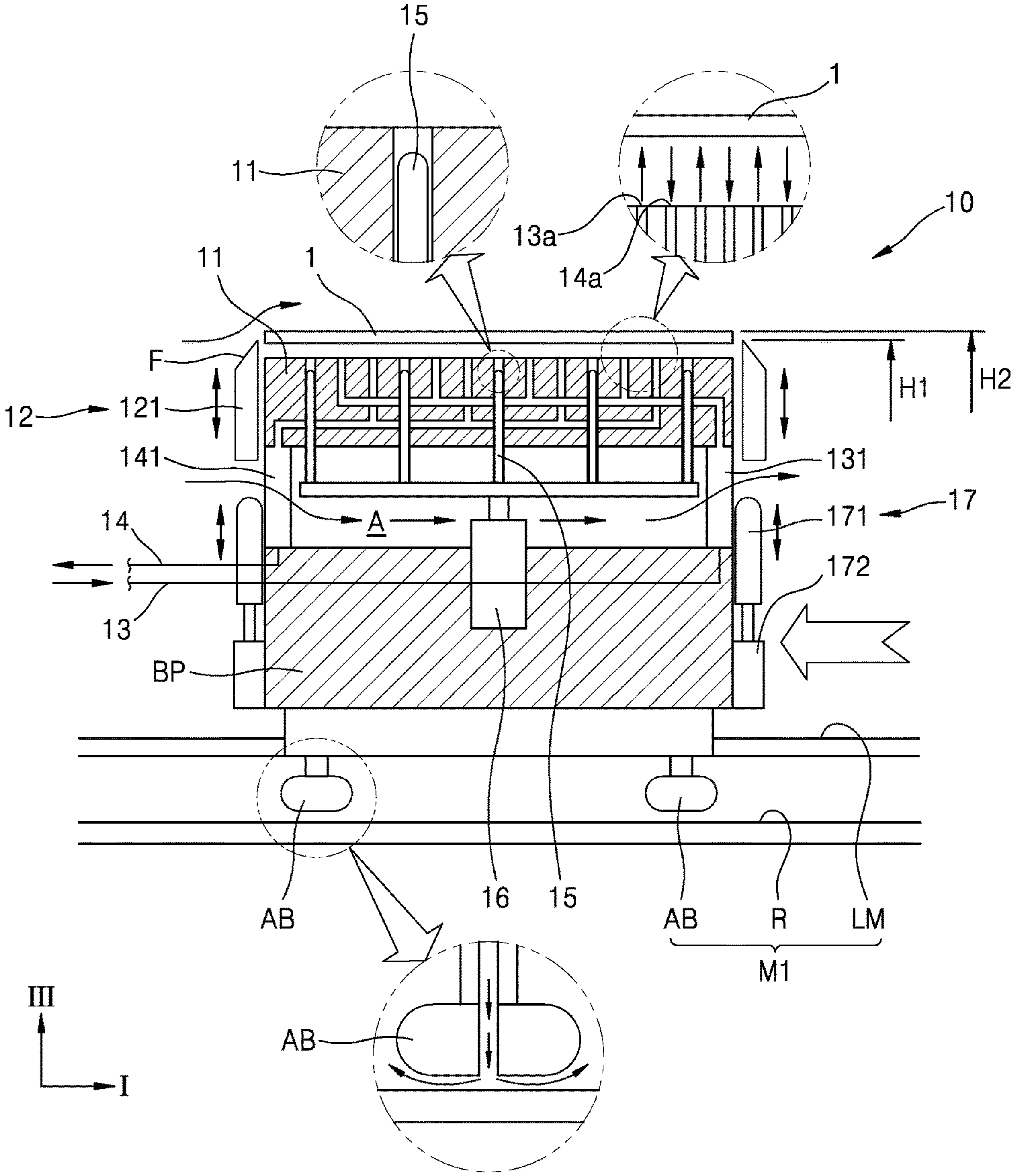
FIG. 5 is a cross-sectional view cut along line V-V of the substrate stage of FIG. 4.
Figure 6:
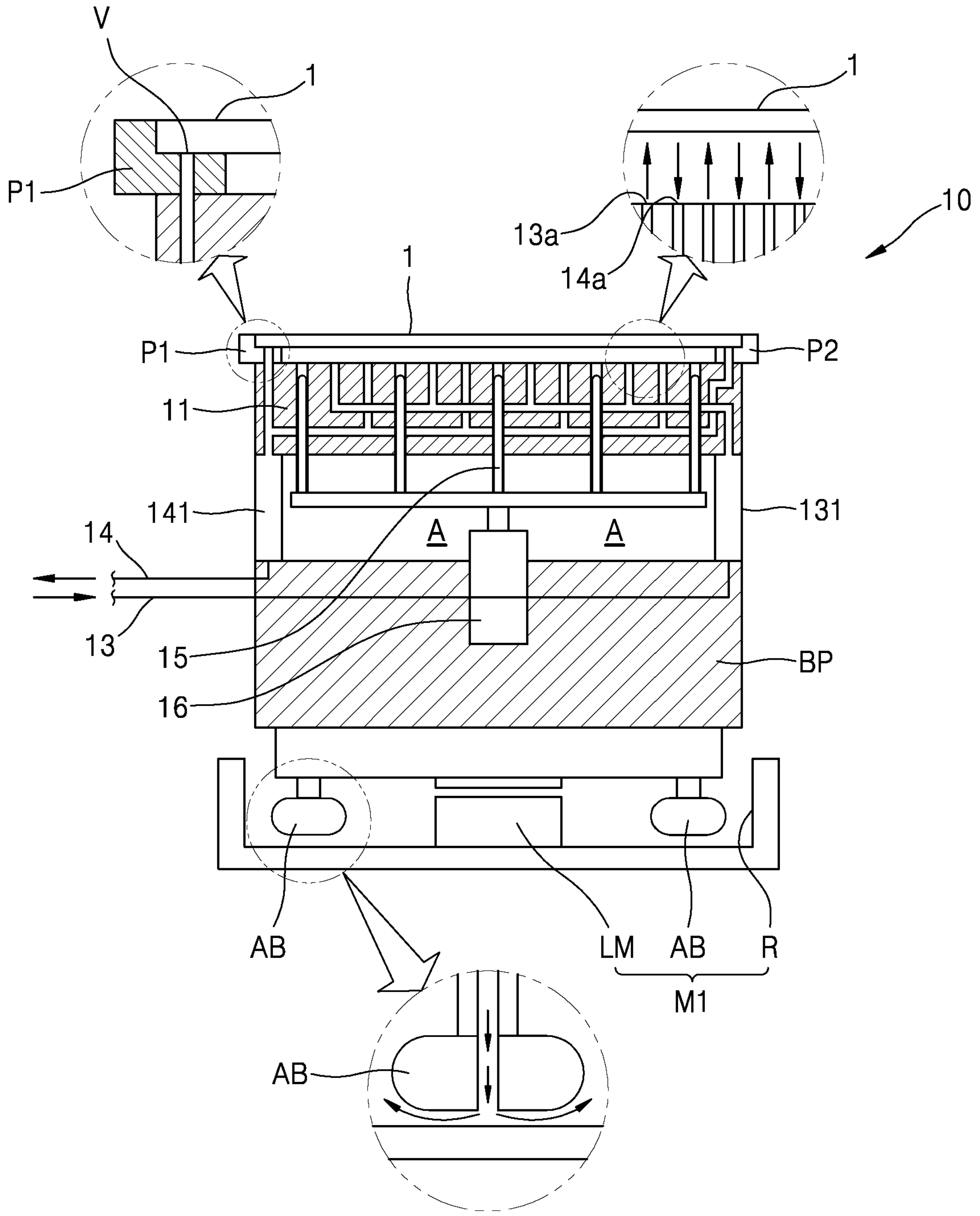
FIG. 6 is a cross-sectional view cut along line VI-VI of the substrate stage of FIG. 4.

FIG. 4 is an enlarged perspective view of the substrate stage 10 of the treatment liquid ejector 100 of FIG. 2, FIG. 5 is a cross-sectional view cut along line V-V of the substrate stage 10 of FIG. 4, and FIG. 6 is a cross-sectional view cut along line VI-VI of the substrate stage 10 of FIG. 4.

As shown in FIGS. 4 to 6, the substrate stage 10 according to some embodiments of the present invention will now be described. Initially, for example, as shown in FIG. 5, the airflow blocking member 12 may include airflow blocking blades 121 each having a slope F at an upper end to generate a diagonally upward airflow and having an upper end height H1 lower than an upper surface height H2 of the floated substrate 1.

The slope F may be inclined at an angle of 30° to 60° based on a horizontal line to guide an airflow, which is relatively generated when the substrate stage 10 is moved, in a diagonally upward direction. According to repeated test results, to suppress the generation of turbulence as much as possible, the angle of the slope F may be about 45° from the horizontal line.

However, the slope F is not limited to the above-mentioned angle and slopes of various angles are all applicable. In addition, the slope F is not limited to a planar slope and a wide variety of slopes including a curved slope are all applicable.

The upper end height H1 of the airflow blocking blades 121 may be adjusted using a height adjuster 122 or another lifting device.

Therefore, when the substrate stage 10 is moved, the airflow blocking blades 121 may induce airflow upward by using the slopes F to protect a gap between the substrate 1 and the floating plate 11.

For example, the substrate stage 10 may further include a gas supply line 13 connected to one or more emission holes 13*a* provided in the floating plate 11 to supply a gas to the emission holes 13*a*, and a gas suction line 14 connected to one or more suction holes 14*a* provided in the floating plate 11 to suck a gas through the suction holes 14*a*.

Accordingly, the substrate 1 may be floated to a certain height from the floating plate 11 by a positive pressure formed by the gas supply line 13 and a negative pressure formed by the gas suction line 14.

For example, the substrate stage 10 may further include lift pins 15 liftably mounted in the floating plate 11 to support the substrate 1, and a lift pin lifting device 16 for lifting the lift pins 15.

Therefore, the substrate stage 10 may seat the substrate 1 thereon by lifting the lift pins 15, and then the substrate 1 may be floated to a certain height from the floating plate 11 by using the gas supply line 13 and the gas suction line 14, and the lift pins 15 may be lowered into the floating plate 11 after the substrate 1 is floated.

The substrate stage 10 may further include a base plate BP spaced apart from the floating plate 11 to form an airflow induction space A, a gas supply pipe 131 mounted in a portion of the airflow induction space A and connected to the gas supply line 13, and a gas suction pipe 141 mounted in another portion of the airflow induction space A and connected to the gas suction line 14.

Herein, the gas supply pipe 131 and the gas suction pipe 141 may serve to support the floating plate 11 from the airflow induction space A, and the airflow induction space A may be formed with a hydrodynamically optimal volume by adjusting lengths of the gas supply pipe 131 and the gas suction pipe 141.

The substrate stage 10 may further include an airflow induction member 17 for blocking at least a portion of the airflow induction space A to adjust an aperture ratio of the airflow induction space A in order to prevent turbulence relatively generated nearby when the substrate stage 10 is moved. Specifically, for example, the airflow induction member 17 may include airflow induction blades 171 each having a rounded upper end or having at least a portion provided in a streamlined shape to prevent the generation of turbulence.

Herein, an upper end height of the airflow induction blades 171 may be adjusted using a blade lifting device 172 or a height adjuster based on a transfer speed of the substrate stage 10 or the airflow.

Therefore, using the airflow induction member 17, turbulence irregularly generated depending on an ambient environment, process conditions, specifications of the substrate stage 10, a speed of the substrate stage 10, or the like may be suppressed and thus the flow of treatment liquid mist or fume gas into the gap between the substrate 1 and the floating plate 11 or an impact point error of the treatment liquid due to the turbulence may be prevented.

As shown in FIG. 6, the substrate stage 10 may further include a left adsorption pad P1 provided on a left side of an upper surface of the floating plate 11 and having at least a portion higher than the floating plate 11 to adsorb a left side of a lower surface of the substrate 1 through one or more vacuum adsorption holes V, and a right adsorption pad P2 provided on a right side of the upper surface of the floating plate 11 and having at least a portion higher than the floating plate 11 to adsorb a right side of the lower surface of the substrate 1 through one or more vacuum adsorption holes V.

Herein, the vacuum adsorption holes V of the left adsorption pad P1 and the vacuum adsorption holes V of the right adsorption pad P2 may be connected to the gas suction line 14.

Therefore, a left edge and a right edge of the substrate 1 may be firmly vacuum-adsorbed using the left and right adsorption pads P1 and P2, and the other portion of the substrate 1 may be floated to a certain height from the floating plate 11 by using the above-described gas supply line 13 and gas suction line 14.

The substrate stage 10 may further include a first moving device M1 for moving the substrate stage 10 in the first direction I from a standby position to a treatment liquid ejection position.

The first moving device M1 may include a linear motor LM for moving the substrate stage 10 along a transfer rail R, and air bearings AB mounted under the substrate stage to support the substrate stage 10 with pressure of air.

Accordingly, the substrate stage 10 may be moved in a non-contact or low-friction manner by the linear motor LM and the air bearings AB and thus the generation of foreign substances may be prevented as much as possible.

Therefore, according to the present invention, because airflow flowing into a gap between the substrate 1 and the floating plate 11 when the substrate 1 is floated may be blocked using the airflow blocking member 12 to prevent the suction holes 14*a* from being narrowed or clogged by mist or foreign substances included in the airflow, precision or accuracy of printing may be increased by preventing deformation of the substrate 1 when the substrate 1 is floated and printed, the substrate stage 10 capable of floating the substrate 1 may be rapidly transferred forward or backward by firmly fixing the substrate 1 by using the left and right adsorption pads P1 and P2, turbulence generated when the substrate stage 10 is transferred may be prevented using the airflow induction member 17, and time loss such as equipment stoppage may be prevented to greatly increase productivity.

Figure 7:
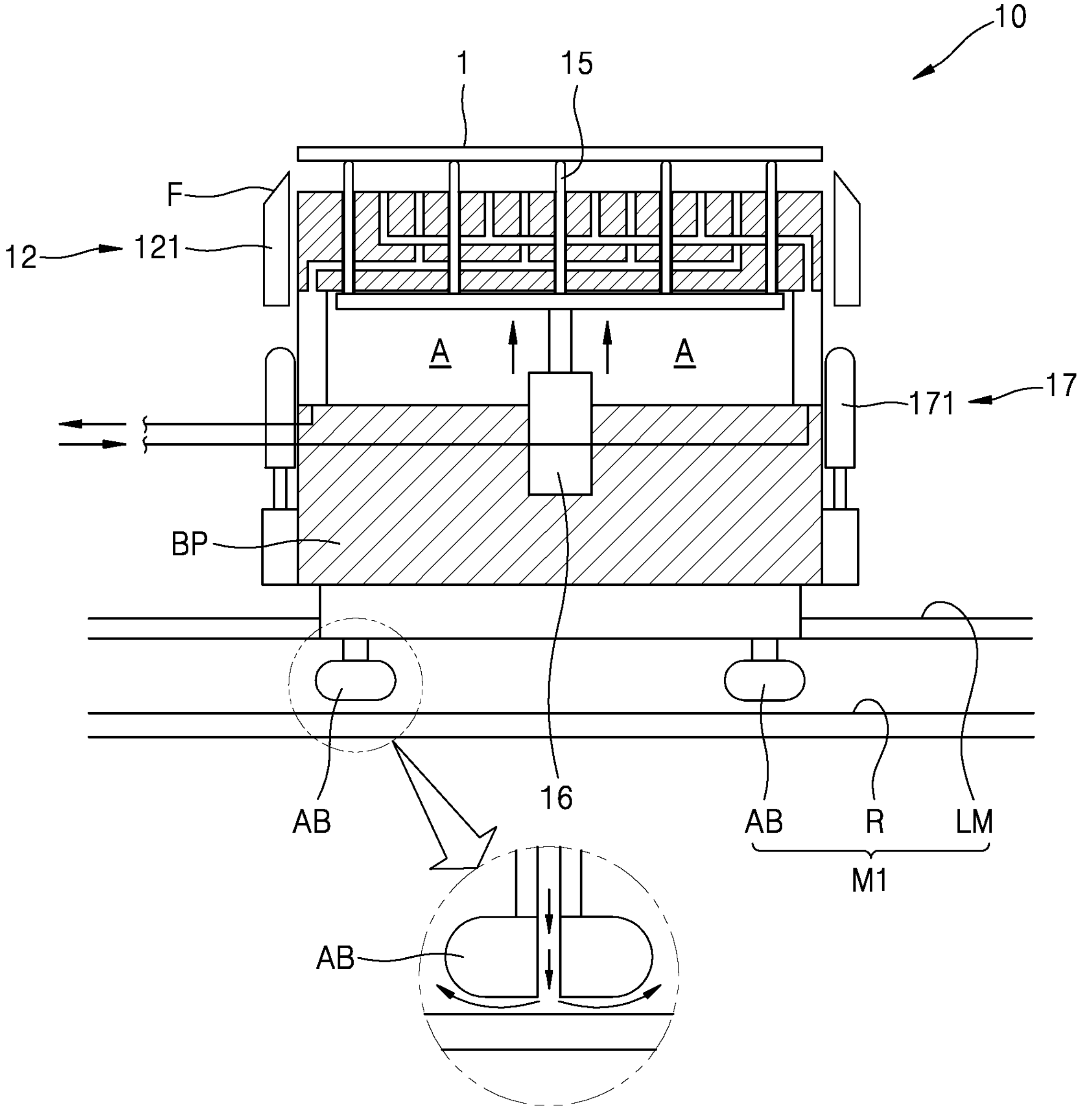
FIGS. 7 to 9 are cross-sectional views showing operation of the substrate stage step by step.
Figure 8:
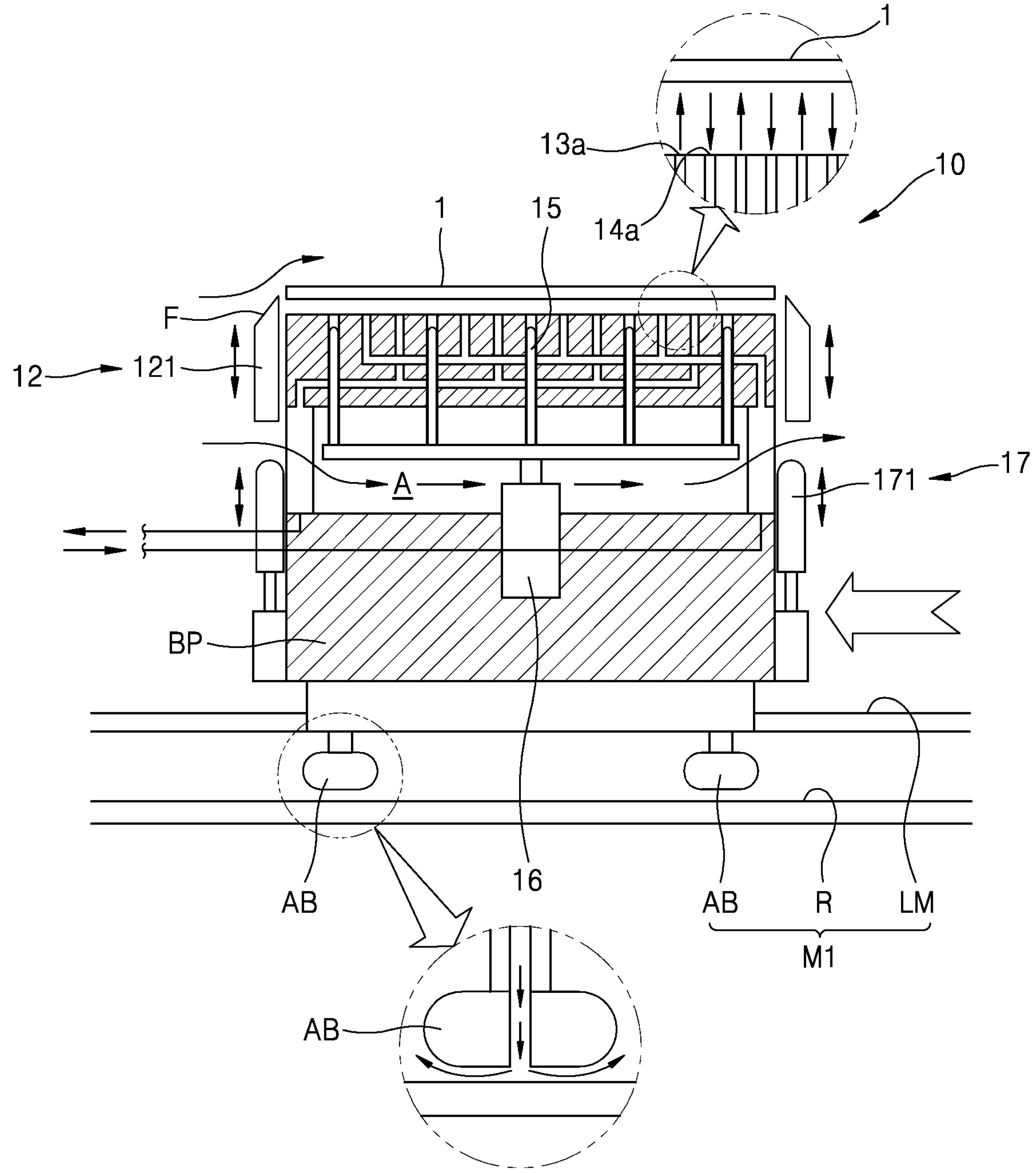
Figure 9:
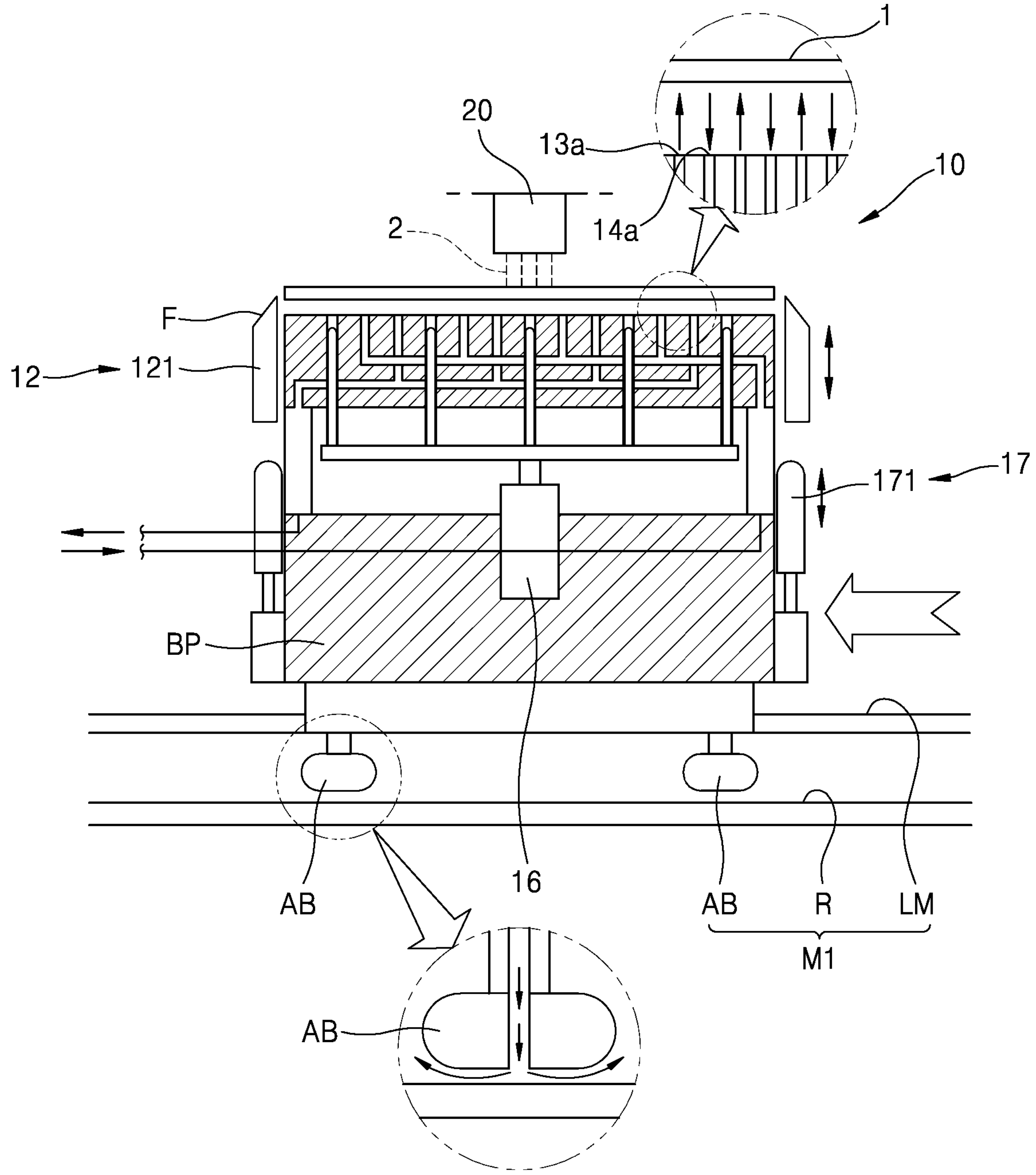

FIGS. 7 to 9 are cross-sectional views showing operation of the substrate stage step by step.

As shown in FIGS. 7 to 9, operation of the treatment liquid ejector 100 of the substrate processing apparatus 1000 according to some embodiments of the present invention will now be described step by step. Initially, as shown in FIG. 7, the substrate 1 may be received from a substrate transfer device by lifting the lift pins 15 from the floating plate 11 of the substrate stage 10.

Then, as shown in FIG. 8, the substrate 1 may be floated to a certain height from the floating plate 11 by using the gas supply line 13 and the gas suction line 14 while lowering the lift pins 15, and airflow flowing into a gap between the substrate 1 and the substrate stage 10 may be blocked using the airflow blocking member 12.

In this case, both edges of a lower surface of the substrate 1 may be adsorbed using the left and right adsorption pads P1 and P2.

Then, the substrate stage 10 may be moved in the first direction I from a standby position to a treatment liquid ejection position by using the linear motor LM and the air bearings AB of the first moving device M1.

In this case, turbulence generated when the substrate stage 10 is moved in the first direction I may be prevented using the airflow induction member 17.

Then, as shown in FIG. 9, a treatment liquid 2 may be ejected onto the substrate 1 at the treatment liquid ejection position while moving the treatment liquid ejection device in the second direction II by using the second moving device M2.

In this case, as described above, airflow flowing into the gap between the substrate 1 and the substrate stage 10 may be blocked using the airflow blocking member 12, and turbulence generated when the substrate stage 10 is moved in the first direction I may be prevented using the airflow induction member 17.

Figure 10:
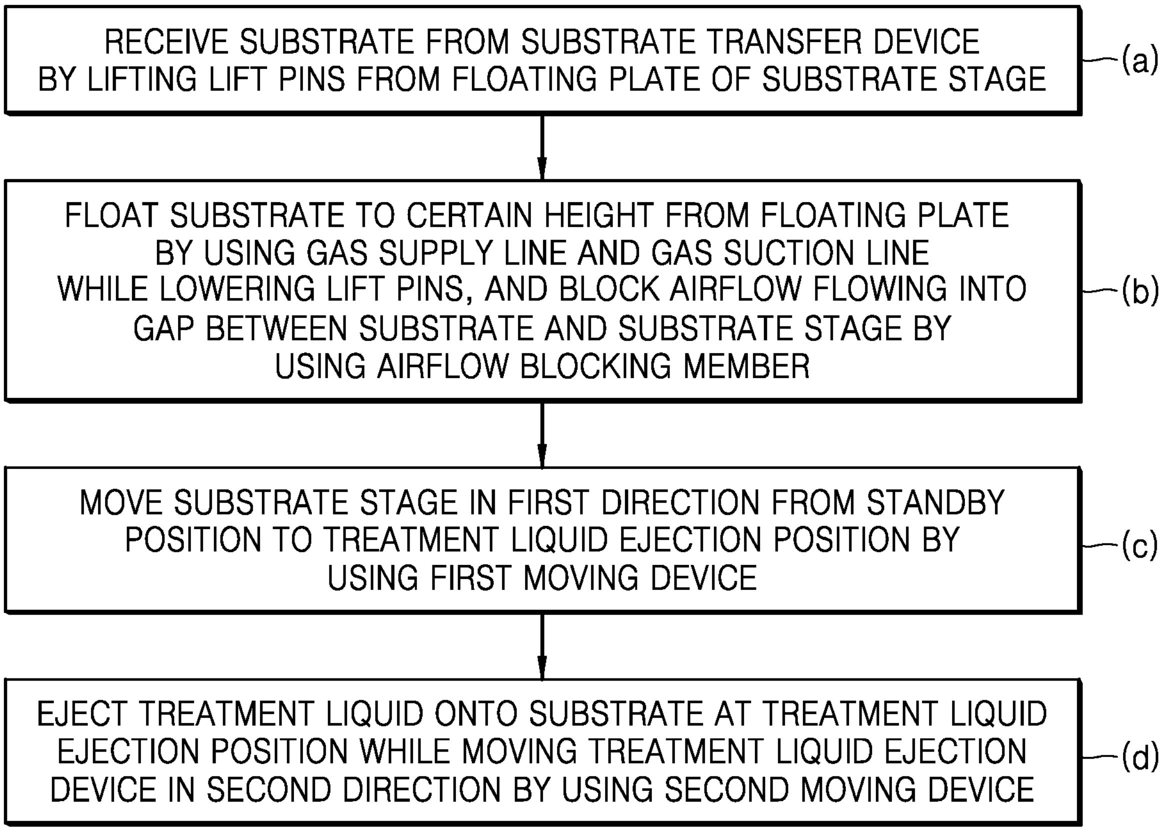
FIG. 10 is a flowchart of a substrate processing method according to some embodiments of the present invention.

FIG. 10 is a flowchart of a substrate processing method according to some embodiments of the present invention.

As shown in FIGS. 1 to 10, the substrate processing method according to some embodiments of the present invention may include (a) receiving the substrate 1 from a substrate transfer device by lifting the lift pins 15 from the floating plate 11 of the substrate stage 10, (b) floating the substrate 1 to a certain height from the floating plate 11 by using the gas supply line 13 and the gas suction line 14 while lowering the lift pins 15, and blocking airflow flowing into a gap between the substrate 1 and the substrate stage 10 by using the airflow blocking member 12, (c) moving the substrate stage 10 in the first direction I from a standby position to a treatment liquid ejection position by using the first moving device M1, and (d) ejecting the treatment liquid 2 onto the substrate 1 at the treatment liquid ejection position while moving the treatment liquid ejection device 20 in the second direction II by using the second moving device M2.

In step (b), both edges of a lower surface of the substrate 1 may be adsorbed using the left and right adsorption pads P1 and P2.

In step (c) or (d), turbulence generated when the substrate stage 10 is moved in the first direction I may be prevented using the airflow induction member 17.

In step (c) or (d), the substrate stage 10 may be moved in the first direction I by using the linear motor LM and the air bearings AB.

According to the afore-described embodiments of the present invention, because airflow or fume gas flowing into a gap between a substrate and a floating plate when the substrate is floated may be blocked using an airflow blocking member to prevent suction holes from being narrowed or clogged, precision or accuracy of printing may be increased by preventing deformation of the substrate when the substrate is floated and printed, a substrate stage capable of floating the substrate may be rapidly transferred forward or backward by firmly fixing the substrate by using a left adsorption pad and a right adsorption pad, turbulence generated when the substrate stage is transferred may be prevented using an airflow induction member, and time loss such as equipment stoppage may be prevented to greatly increase productivity. However, the scope of the present invention is not limited to the above effects.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A substrate processing apparatus comprising:

a substrate stage for supporting a substrate; and a treatment liquid ejection device mounted above the substrate stage to eject a treatment liquid onto the substrate, wherein the substrate stage comprises:

a floating plate for floating at least a portion of the substrate; and an airflow blocking member for blocking at least a portion of a gap between the substrate and the floating plate to block airflow flowing into the gap wherein the airflow blocking member comprises airflow blocking blades each having an external-facing slope at an upper end facing away from the floated substrate to generate a diagonally upward airflow and having an upper end height lower than an upper surface height of the floated substrate, and wherein the upper end height of the airflow blocking blades is adjusted using a height adjuster.

2. The substrate processing apparatus of claim 1, wherein the substrate stage further comprises:

a gas supply line connected to one or more emission holes provided in the floating plate to supply a gas to the emission holes; and a gas suction line connected to one or more suction holes provided in the floating plate to suck a gas through the suction holes.

3. The substrate processing apparatus of claim 2, wherein the substrate stage further comprises:

a left adsorption pad provided on a left side of an upper surface of the floating plate and having at least a portion higher than the floating plate to adsorb a left side of a lower surface of the substrate through one or more vacuum adsorption holes; and a right adsorption pad provided on a right side of the upper surface of the floating plate and having at least a portion higher than the floating plate to adsorb a right side of the lower surface of the substrate through one or more vacuum adsorption holes.

4. The substrate processing apparatus of claim 3, wherein the vacuum adsorption holes of the left adsorption pad and the vacuum adsorption holes of the right adsorption pad are connected to the gas suction line.

5. The substrate processing apparatus of claim 2, wherein the substrate stage further comprises:

lift pins liftably mounted in the floating plate to support the substrate; and a lift pin lifting device for lifting the lift pins.

6. The substrate processing apparatus of claim 2, wherein the substrate stage further comprises:

a base plate spaced apart from the floating plate to form an airflow induction space;

a gas supply pipe mounted in a portion of the airflow induction space and connected to the gas supply line; and a gas suction pipe mounted in another portion of the airflow induction space and connected to the gas suction line.

7. The substrate processing apparatus of claim 6, wherein the substrate stage further comprises an airflow induction member for blocking at least a portion of the airflow induction space to adjust an aperture ratio of the airflow induction space in order to prevent generation of turbulence.

8. The substrate processing apparatus of claim 7, wherein the airflow induction member comprises airflow induction blades each having a rounded upper end or having at least a portion provided in a streamlined shape to prevent generation of turbulence.

9. The substrate processing apparatus of claim 8, wherein an upper end height of the airflow induction blades is adjusted using a height adjuster.

10. The substrate processing apparatus of claim 8, wherein the airflow induction blades are lifted using a blade lifting device based on a transfer speed of the substrate stage or the airflow.

11. The substrate processing apparatus of claim 1, further comprising a first moving device for moving the substrate stage in a first direction from a standby position to a treatment liquid ejection position.

12. The substrate processing apparatus of claim 11, wherein the first moving device comprises:

a linear motor for moving the substrate stage along a transfer rail; and air bearings mounted under the substrate stage to support the substrate stage with pressure of air.

13. The substrate processing apparatus of claim 11, further comprising a second moving device for moving the treatment liquid ejection device in a second direction.

14. A substrate processing method comprising:

(a) receiving a substrate from a substrate transfer device by lifting lift pins from a floating plate of a substrate stage;

(b) floating the substrate to a certain height from the floating plate by using a gas supply line and a gas suction line while lowering the lift pins, and blocking airflow flowing into a gap between the substrate and the substrate stage by using an airflow blocking member;

(c) moving the substrate stage in a first direction from a standby position to a treatment liquid ejection position by using a first moving device; and (d) ejecting a treatment liquid onto the substrate at the treatment liquid ejection position while moving a treatment liquid ejection device in a second direction by using a second moving device, wherein, in step (b), both edges of a lower surface of the substrate are adsorbed using a left adsorption pad and a right adsorption pad.

15. The substrate processing method of claim 14, wherein, in step (c) or (d), turbulence generated when the substrate stage is moved in the first direction is prevented using an airflow induction member.

16. The substrate processing method of claim 14, wherein, in step (c) or (d), the substrate stage is moved in the first direction by using a linear motor and air bearings.

17. A substrate processing apparatus comprising:

a substrate stage for supporting a substrate;

a first moving device for moving the substrate stage in a first direction from a standby position to a treatment liquid ejection position;

a treatment liquid ejection device mounted above the substrate stage to eject a treatment liquid onto the substrate; and a second moving device for moving the treatment liquid ejection device in a second direction, wherein the substrate stage comprises:

a floating plate for floating at least a portion of the substrate;

an airflow blocking member for blocking at least a portion of a gap between the substrate and the floating plate to block airflow flowing into the gap when the floating plate is moved in the first direction;

a gas supply line connected to one or more emission holes provided in the floating plate to supply a gas to the emission holes;

a gas suction line connected to one or more suction holes provided in the floating plate to suck a gas through the suction holes;

a left adsorption pad provided on a left side of an upper surface of the floating plate and having at least a portion higher than the floating plate to adsorb a left side of a lower surface of the substrate through one or more vacuum adsorption holes;

a right adsorption pad provided on a right side of the upper surface of the floating plate and having at least a portion higher than the floating plate to adsorb a right side of the lower surface of the substrate through one or more vacuum adsorption holes;

a base plate spaced apart from the floating plate to form an airflow induction space; and an airflow induction member for blocking at least a portion of the airflow induction space to adjust an aperture ratio of the airflow induction space in order to prevent generation of turbulence.

* * * * *